United States Patent
Sankaran et al.

(10) Patent No.: US 8,819,712 B2
(45) Date of Patent: Aug. 26, 2014

(54) SYSTEM AND METHOD FOR DISPLAYING A CUSTOMIZED MULTIMEDIA CONTENT

(75) Inventors: Ayyappan Sankaran, San Jose, CA (US); Jayant Kadambi, Mountain view, CA (US)

(73) Assignee: Yume, Inc., Redwood City, CA (US)

( * ) Notice: Subject to any disclaimer, the term of this patent is extended or adjusted under 35 U.S.C. 154(b) by 1281 days.

(21) Appl. No.: 11/620,732

(22) Filed: Jan. 8, 2007

(65) Prior Publication Data

US 2008/0005655 A1     Jan. 3, 2008

Related U.S. Application Data

(60) Provisional application No. 60/806,107, filed on Jun. 29, 2006.

(51) Int. Cl.
*H04N 7/10*       (2006.01)
*G06F 13/00*     (2006.01)

(52) U.S. Cl.
USPC .......... 725/12; 725/14; 725/34; 725/35; 725/42; 725/46; 725/47; 715/201

(58) Field of Classification Search
USPC ......... 725/12, 14, 34, 35, 42, 46, 47; 715/201
See application file for complete search history.

(56) References Cited

U.S. PATENT DOCUMENTS 6,339,761 B1 * 1/2002 Cottingham ............... 705/14.66
7,398,270 B1 * 7/2008 Choi et al. ..................... 707/6
2001/0013124 A1 * 8/2001 Klosterman et al. ........... 725/36
2001/0042246 A1 * 11/2001 Yuen et al. ...................... 725/1
2002/0053084 A1 * 5/2002 Escobar et al. ................ 725/47
2002/0059602 A1 * 5/2002 Macrae et al. ................. 725/42
2002/0073424 A1 * 6/2002 Ward et al. .................... 725/42
2002/0078006 A1 * 6/2002 Shteyn ........................... 707/1
2002/0099600 A1 * 7/2002 Merriman et al. ........... 705/14
2003/0110492 A1 * 6/2003 Thurston et al. ............. 725/39
2003/0158789 A1 * 8/2003 Miura et al. ................. 705/26
2005/0246231 A1 * 11/2005 Shkedi ......................... 705/14
2005/0266814 A1 * 12/2005 Steelberg et al. ......... 455/186.1
2006/0064734 A1 * 3/2006 Ma ............................. 725/136

* cited by examiner

*Primary Examiner* — Nathan Hillery
(74) *Attorney, Agent, or Firm* — TIPS Group

(57) ABSTRACT

A system and method for displaying a multimedia content over a network is provided. The multimedia content comprises a standard-content part and a customized-content part. The customized-content part comprises one or more multimedia components. The method comprises the steps of selecting one or more of the multimedia components based on a predetermined set of preferences to obtain a multimedia component set comprising one or more multimedia components. The method further comprises customizing dynamically one or more of the multimedia components belonging to the multimedia component set based on the predetermined set of preferences. Thereafter, the method integrates the multimedia components to obtain the customized-content part. Further, the customized-content part is associated with the multimedia content and the multimedia content is displayed with the customized-content part.

12 Claims, 6 Drawing Sheets

SYSTEM AND METHOD FOR DISPLAYING A CUSTOMIZED MULTIMEDIA CONTENT

This application claims priority under 35 USC Ð 119 (e) (1) of provisional application No. 60/806,107 Filed on 29 Jun. 2006.

FIELD OF INVENTION

The present invention relates generally to a method and system for displaying a multimedia content over a network. More specifically, the present invention relates to a method and system for customizing the multimedia content before displaying the multimedia content over a network.

BACKGROUND OF THE INVENTION AND PRIOR ART

Conventionally, a multimedia content comprises a standard-content part and a customized-content part. A customized-content part of a multimedia content can be displayed before, during and/or after the display of a standard-content part of the multimedia content. A customized-content part can be customized to meet a specific set of preferences. The set of specific preferences can depend on for example, geography, subscriber demographics, device type, viewing patterns of viewers. One example of such a customized-content part is an advertising content which can be displayed before, during and/or after the standard-content part of a multimedia content. One example of such a standard-content part is a video content.

Typically, an advertisement is created and stored prior to displaying the advertisement in a multimedia content. The advertisement may have various advertising-components. The advertising-components can be for example, a video clip, an audio message, a text message and a graphic content. The video clip, the audio message and the text message are integrated for creating an advertisement as per requirements. Therefore, an advertisement comprising one or more of a video clip, an audio message, a text message and a graphic is treated as an individual entity. In order to display an advertisement, the advertisement including one or more advertising-components is inserted in a multimedia content. The advertisement can be customized on the basis of the set of specific preferences. However, in case if only one of the audio message, the video clip, the text message or the graphic content needs to be customized for a specific region or for a set of audience, the advertisement as a whole is required to be customized to meet the set of specific preferences. Therefore, the advertisement is recreated and inserted back into another multimedia content for displaying.

The process of recreating a customized-content part or an advertisement to adapt to the specific set of preferences is time consuming, expensive and inconvenient. Therefore, there is a need for a method and a system with dynamic customization capabilities, to introduce more flexibility into the system in order to create targeted customized-content part to meet the set of specific preferences such as geography, subscriber demographics, device type and viewing patterns of the viewers.

SUMMARY

An object of the present invention is to provide a method and system to customize a customized-content part of a multimedia content to be displayed.

Another object of the present invention is to provide a method and system to enable more flexibility for customization of a customized-content part of a multimedia content to be displayed.

The above listed objectives are achieved by providing a system and method for displaying a multimedia content over a network. The multimedia content comprises a standard-content part and a customized-content part. The customized-content part comprises one or more multimedia components. The method comprises the steps of selecting one or more of the multimedia components based on a predetermined set of preferences to obtain a multimedia component set comprising one or more multimedia components. The method further comprises customizing dynamically one or more of the multimedia components belonging to the multimedia component set based on the predetermined set of preferences. Thereafter, the method integrates the multimedia components to obtain the customized-content part. Further, the customized-content part is associated with the multimedia content and the multimedia content is displayed with the customized-content part.

In another embodiment of the present invention, the multimedia component comprises one or more customized multimedia-segments. The method comprises selecting one or more of the customized multimedia-segments from a corresponding multimedia component belonging to the multimedia component set based on the predetermined set of preferences to obtain a customized multimedia-segment set. The method further comprises integrating one or more customized multimedia-segments belonging to the customized multimedia-segment set to obtain a customized-content part. Thereafter, the customized-content part is associated with the multimedia content and displayed with multimedia content.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
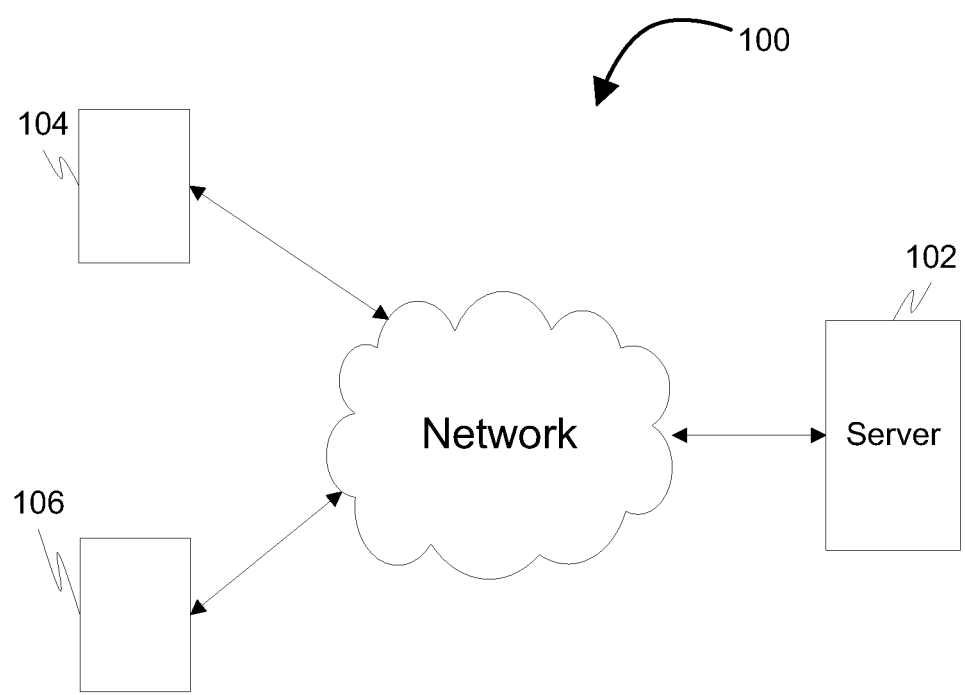
FIG. 1 is a block diagram showing an environment (that is exemplary) in which various embodiment of the present invention can function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the present invention, it should be observed that the embodiments reside primarily in combinations of method steps and apparatus components related to a system and method for customizing and displaying one or more multimedia contents. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the present invention provide a system and method for customizing and displaying one or more multimedia contents over a network. The multimedia contents may be made available on a website and/or a television channel by a multimedia content owner. The multimedia content owner may be a website owner or a television channel. A multimedia content may comprise a standard-content part and a customized-content part. The standard-content part may be one or more of a photo, a video, and an audio. The customized-content part may comprise one or more advertisements. Therefore, when the multimedia content is viewed, one or more advertisements associated with it are also accessed along with the standard-content part.

FIG. 1 is a block diagram showing an environment 100 (that is exemplary) in which various embodiment of the invention can function. Environment 100 includes a server 102, a device 104 and a device 106. It will be apparent to people skilled in the art that environment 100 may include more than two devices. Examples of a device may include, but are not limited to, a Set Top Box (STB), a television, a cell phone, a Personal Digital Assistant (PDA), a computer, a laptop, a palmtop, and an e-book.

One or more devices 104 and device 106 accesses one or more multimedia contents over a network through server 102. The network can be, but not limited to, an Internet Protocol (IP) based network and a web based video broadcast network. A multimedia content comprises a standard-content part and a customized-content part. Server 102 is configured to customize the customized-content part corresponding to the multimedia content. Server 102 may be provided by a cable operator who provides cable service. Alternatively, server 102 may be associated with a website through which a multimedia content is accessed by one or more of device 104 and device 106.

Figure 2:
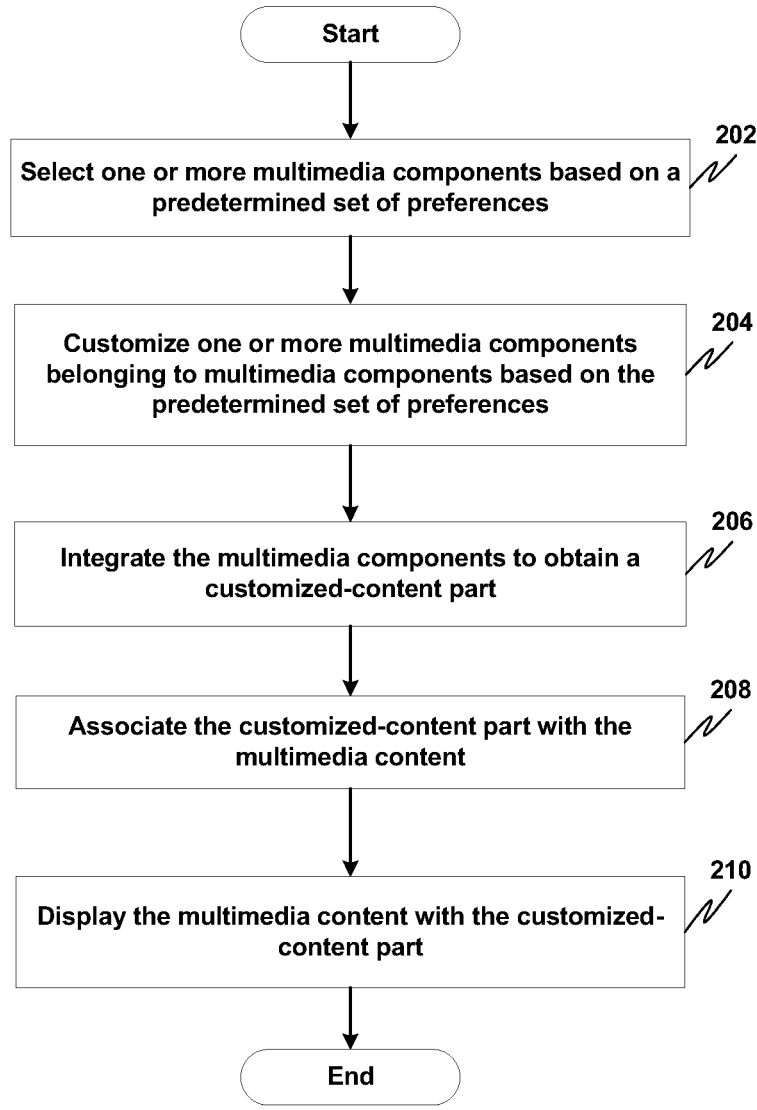
FIG. 2 is a flowchart of a method for displaying a customized multimedia content, in accordance with an embodiment of the present invention.

FIG. 2 is a flowchart of a method for displaying a multimedia content, in accordance with an embodiment of the present invention. A multimedia content may comprise a standard-content part and a customized-content part. A customized-content part is functionally and/or structurally independent of a standard-content part. In an embodiment of the present invention, the customized-content part comprises one or more multimedia component. A multimedia component can be one of a text component, an audio component, a video component and a graphic content. A multimedia content is customized by server 102 and displayed on one or more of device 104 and device 106.

At step 202, one or more multimedia components corresponding to the customized-content part are selected by server 102 based on the predetermined set of preferences to obtain a multimedia component set. The multimedia component set obtained at step 202 comprises one or more multimedia components. The predetermined set of preferences comprises one or more of a geography of viewers of the customized-content part, a psychographic information of the viewers of the customized-content part, a demographic information of the viewers, a time slot for displaying the customized-content part, a plurality of dates for displaying the customized-content part, a time interval for displaying the customized-content part, a content for displaying the customized-content part and a plurality of responses received from the viewers. In an embodiment of the present invention, the one or more multimedia components corresponding to the customized-content part can be replaced or updated/modified to obtain one or more revised multimedia components. The updating or modification may also be done by updating/modifying one or more customized multimedia-segment for example by replacing or modifying one or more of a video content, an audio content, a text content and a graphic content. A particular customized multimedia-segment may be replaced by a customized multimedia segment of the same type or different type. In an exemplary embodiment of the present invention, the replacement and/or updating of the one or more multimedia-components can be done manually by modifying one or more of a of a video content, an audio content, a text content and a graphic content. In another exemplary embodiment of the present invention, XML-based update methods can be employed to modify the customized-content part at the multimedia component level or customized multimedia segment level.

At step 204, server 102 customizes one or more of the multimedia components belonging to the multimedia component set based on the predetermined set of preferences. In an embodiment of the present invention, the multimedia components further comprises one or more customized multimedia-segments. A customized multimedia-segment may be one of a video content, an audio content, a text content and a graphic content. In an embodiment of the present invention, one or more of the multimedia components and in turn one or more of customized multimedia-segment can be modified in real-time based on responses received from the viewers of the customized-content part. The customized-content part can be targeted to specific viewers based on the predetermined set of preferences including geography such as country, region, city, or zip code, device type such as PC, mobile device, or set-top box, subscriber demographics such as age, gender, consumer viewing patterns such as recently viewed multimedia content or favorite sites visited.

In response to customizing the one or more multimedia components belonging to the multimedia component set, the one or more multimedia components are integrated to obtain the customized-content part at step 206. Thereafter at step 208, the customized-content part is associated with the multimedia content. The customized-content part can be associated with the standard-content part to obtain the multimedia content at any stage. It can be associated at a client-end, the server-end or an intermediate location. In an exemplary embodiment of the present invention, the customized-content part is associated with the multimedia content using browser IFrame/Div-based association method for the multimedia that will be viewed within a web browser. In another exemplary embodiment of the present invention, a client-side playlist integration for the multimedia is achieved, that will be viewed from a viewer's PC and still another exemplary embodiment of the present invention provides a method for associating customized-content part with the standard-content part enabling server-side playlist integration for the multimedia that will be viewed from a server.

At step 210, the multimedia content is displayed over the network along with the customized-content part. The standard-content part such as a video content can be displayed in a pure streaming mode, pure downloading mode or a combination of streaming mode and downloading mode. In an embodiment of the present invention, order of displaying the customized-content part with respect to the standard-content part can be dynamically adjusted. For example, the customized-content part can be displayed before, during or after the standard-content part in the multimedia content. According to an exemplary embodiment of the present invention, the customized-content part can be inserted in pre-roll, mid-roll, and post-roll time slots with reference to the standard-content part.

Also, one or more of the customized multimedia-segments can be displayed at a predetermined location to each other on a device used by a viewer. According to one embodiment of the present invention, one or more of the video content, the audio content, the text content and the graphic content are displayed at the predetermined location relative to one another. For example, the text content and the graphic content may be at a predetermined distance and direction relative to each other for displaying a customized-content part with a predetermined location of the text content and the graphic content relative to each other.

Figure 3:
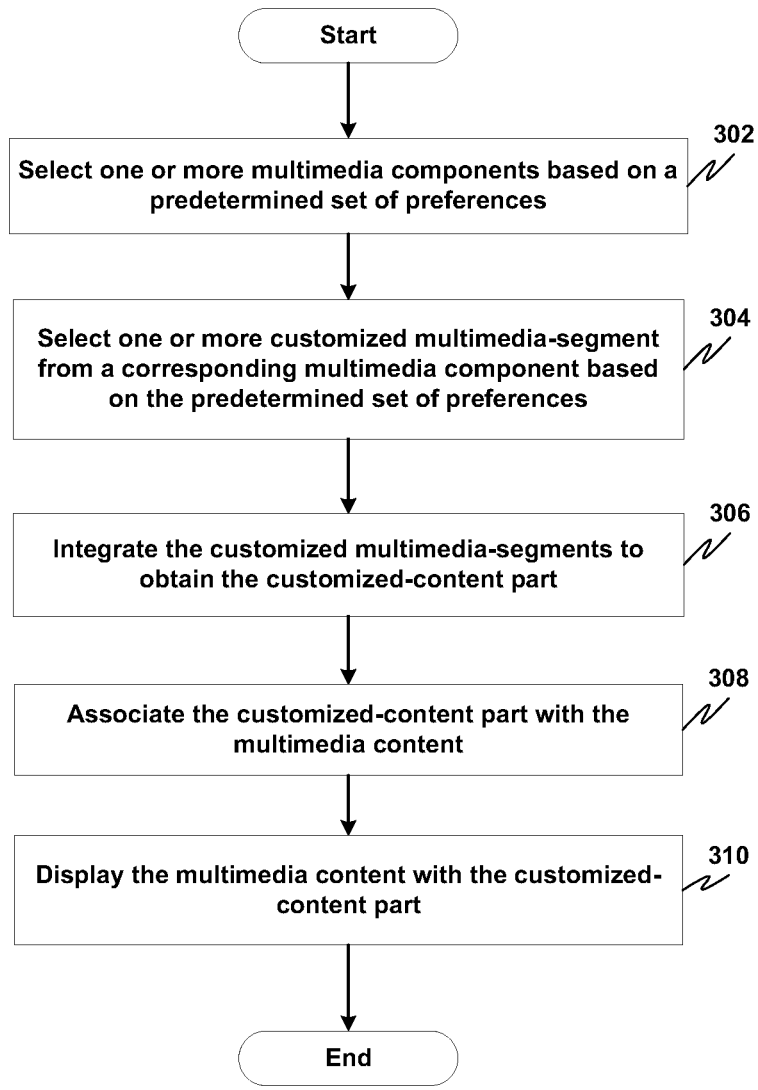
FIG. 3 is a flowchart of a method for displaying a customized multimedia content, in accordance with another embodiment of the present invention.

FIG. 3 is a flowchart of a method for displaying a multimedia content, in accordance with another embodiment of the present invention. The multimedia content comprises a standard-content part and a customized-content part. The customized-content part comprises one or more multimedia components. In an embodiment of the present invention, a multimedia component can be one of a text component, an audio component, a video component and a graphic content. The multimedia component further comprises one or more customized multimedia-segments. A customized multimedia-segment may be one of a video content, an audio content, a text content and a graphic content. In order to customize the multimedia content, server 102 selects one or more of the multimedia components at 302. One or more of the multimedia components are selected based on a predetermined set of preferences to obtain a multimedia component set. In response to selecting one or more of the multimedia components, at step 304, server 102 selects one or more of customized multimedia-segments corresponding to one or more of the multimedia components based on the predetermined set of preferences. As a result a customized multimedia-segment is obtained at step 304. In an exemplary embodiment of the present invention, one or more customized multimedia-segments such as audio content file, video content file, text content file and graphic content file are individual files stored in a storage device. These files are retrieved on the basis of the predetermined set of preferences. Further, at step 306, one or more customized multimedia-segments corresponding to the customized multimedia-segment are integrated to obtain a customized-content part.

The customized-content part can be targeted to specific viewers based on the predetermined set of preferences including geography such as country, region, city, or zip code, device type such as PC, mobile device, or set-top box, subscriber demographics such as age, gender, consumer viewing patterns such as recently viewed multimedia content or favorite sites visited. In addition to targeting specific viewer by geography and other preferences, one or more customized multimedia-segments corresponding to each selected multimedia component can be personalized to deliver specific content to the targeted audience, including text overlays, audio tracks, interactions such as surveys or click-through links, graphics overlays such as logos, that may appear at a predetermined location such as in the corner of the video frame.

At step 308, the customized-content part is associated with the multimedia content and thereafter at step 310, the multimedia content is displayed over the network with the customized-content part. The standard-content part such as video content can be displayed in a pure streaming mode, pure downloading mode or a combination of streaming mode and downloading mode. In an embodiment of the present invention, order of displaying the customized-content part with respect to the standard-content part can be adjusted. For example, the customized-content part can be displayed before, during or after the standard-content part in the multimedia content. According to an exemplary embodiment of the present invention, the customized-content part can be inserted in pre-roll, mid-roll, and post-roll time slots with reference to the standard-content part.

Further, one or more of the customized multimedia-segments are displayed at a predetermined location to each other on a device used by a viewer. According to one embodiment of the present invention, one or more of the video content, the audio content, the text content and the graphic content are displayed at the predetermined location relative to one another. For example, the text content and the graphic content may be at a predetermined distance and direction relative to each other for displaying a customized-content part with a predetermined location of the text content and the graphic content relative to each other.

Figure 4:
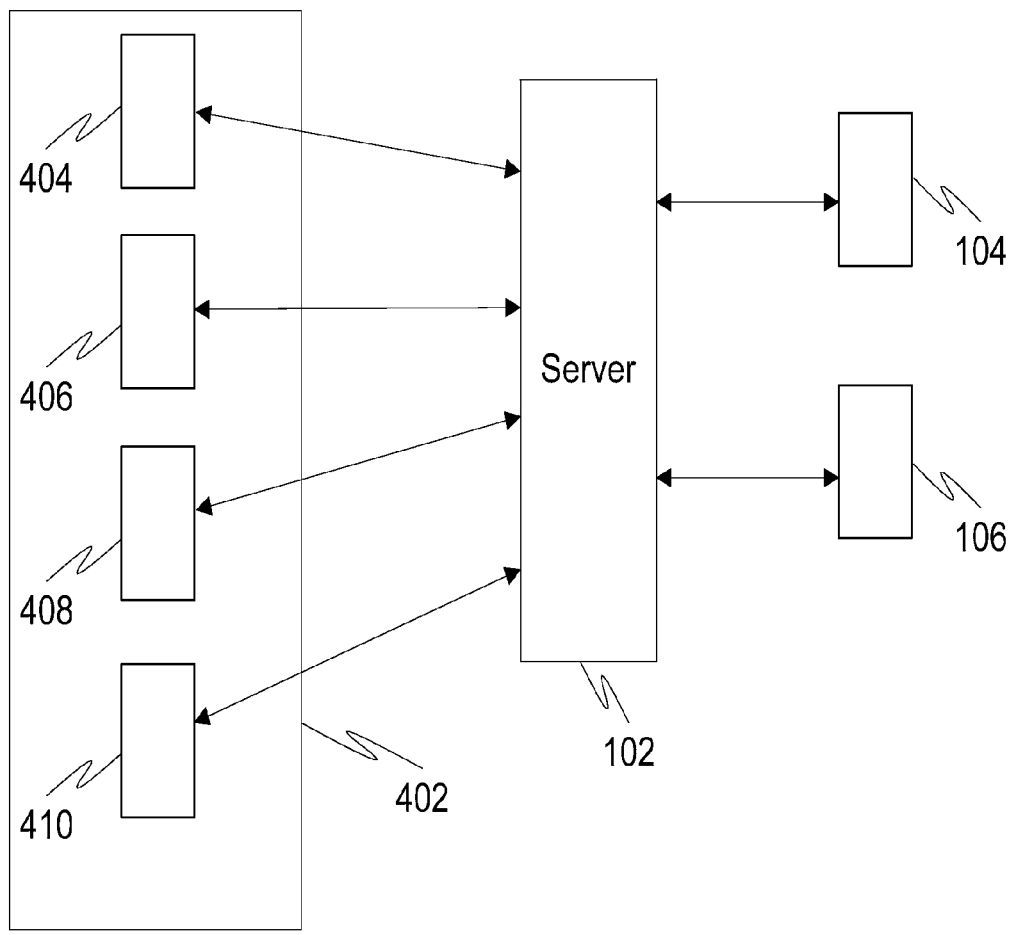
FIG. 4 illustrates an exemplary embodiment for customizing a customized-content part of a multimedia content, in accordance with an embodiment of the present invention.

FIG. 4 illustrates an exemplary embodiment for customizing a customized-content part 402 of a multimedia content, in accordance with an embodiment of the present invention. Customized-content part 402 comprises one or more multimedia components. One or more multimedia components are a video clip 404, an audio component 406, a text component 408 and a graphic component 410. One or more multimedia components comprises one or more customized multimedia-segments. Therefore, video component 404 further comprises one or more customized video contents. Similarly, audio component 406, text component 408 and graphic component 410 further comprise one or more customized audio content, customized text content and customized graphic content respectively. One or more customized video contents, customized audio contents, customized text contents and customized graphic contents are selected for dynamically customizing customized-content part 402 based on the predefined set of preferences to suit a set of audience. In an exemplary embodiment of the present invention, one or more customized video contents and customized text contents are selected for dynamically customizing customized-content part 402 to suit a viewer of device 104 present in a first geographic location. In another exemplary embodiment of the present invention, one or more customized video contents and customized text contents are selected for dynamically customizing customized-content part to suit a viewer of device 106 present in a second geographic location.

Figure 5:
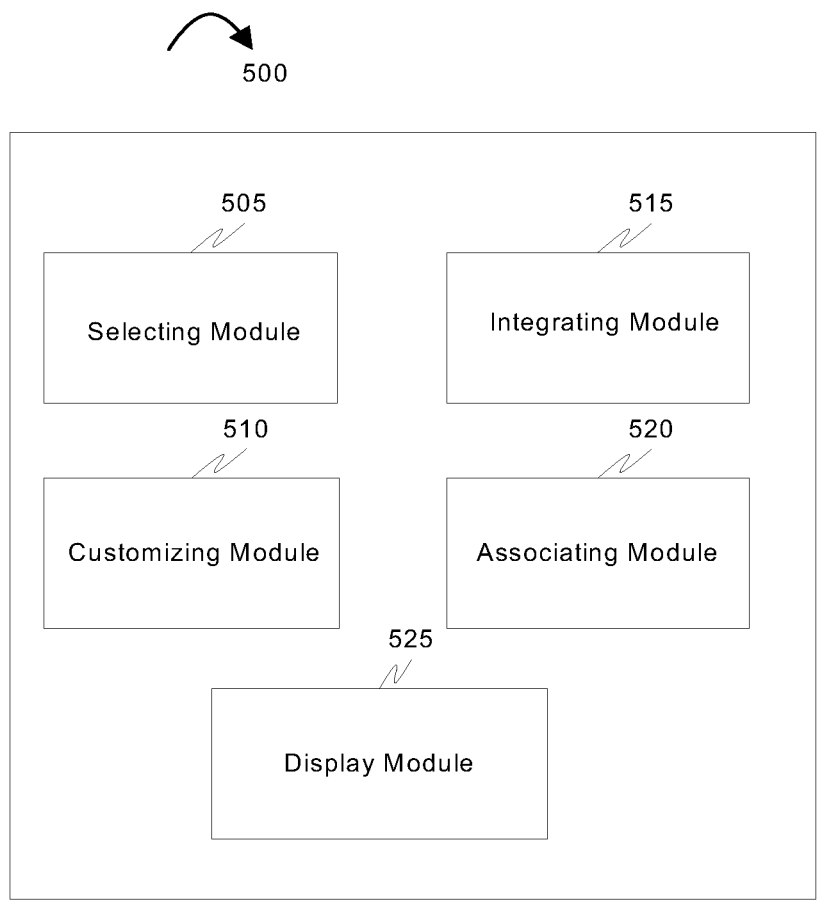
FIG. 5 is a block diagram showing a system for displaying a multimedia content, in accordance with an embodiment of the present invention.

FIG. 5 is a block diagram showing a system 500 for displaying a multimedia content, in accordance with an embodiment of the present invention. System 500 comprises a selecting module 505, a customizing module 510, an integrating module 515, an associating module 520 and a display module 525. Selecting module 505 selects one or more multimedia components corresponding to a customized-content part based on a predetermined set of preferences to obtain a multimedia component set.

Customizing module 510 customizes one or more of the multimedia components belonging to the multimedia component based on the predetermined set of preferences. In an embodiment of the present invention, one or more of the multimedia components can be modified in real-time based on responses received from the viewers of the customized-content part.

In response to customizing the one or more multimedia components belonging to the multimedia component set, integrating module 515 integrates one or more multimedia components to obtain the customized-content part. Thereafter, associating module 520 associates the customized-content with the multimedia content. The customized content part can be associated with the standard-content part to obtain the multimedia content at any stage. It can be associated at a client-end, the server-end or an intermediate location. Displaying module 525 displays the multimedia content along with the customized-content part. The standard-content part such as video content can be displayed in a pure streaming mode, pure downloading mode or a combination of streaming mode and downloading mode. The customized-content part can be displayed before, during or after the standard-content part in the multimedia content. According to an exemplary embodiment of the present invention, the customized-content part can be inserted in pre-roll, mid-roll, and post-roll time slots with reference to the standard-content part.

Figure 6:
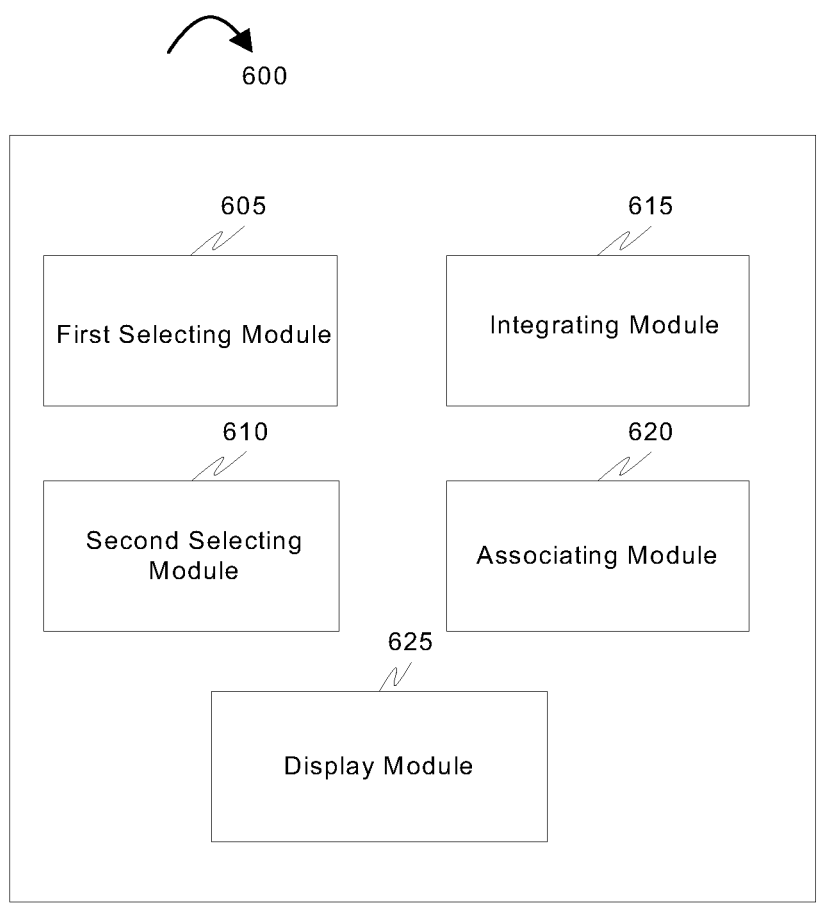
FIG. 6 is a block diagram showing a system for displaying a multimedia content, in accordance with another embodiment of the present invention.

FIG. 6 is a block diagram showing a system 600 for displaying a multimedia content, in accordance with another embodiment of the present invention. The multimedia content may comprise a standard-content part and a customized-content part. The customized-content part comprises one or more multimedia components. In an embodiment of the present invention, a multimedia component can be one of a text component, an audio component, a video component and a graphic content. The multimedia component further comprises one or more customized multimedia-segments. A customized multimedia-segment may be one of a video content, an audio content, a text content and a graphic content.

System 600 comprises a first selecting module 605, a second selecting module 610, an integrating module 615, an associating module 620 and a display module 625. First selecting module 605 selects one or more multimedia components corresponding to a customized-content part based on a predetermined set of preferences to obtain a multimedia component set. In response to selecting one or more of the multimedia components, second selecting module 610 selects one or more of a customized multimedia-segments corresponding to one or more of the multimedia components based on the predetermined set of preferences. As a result, a customized multimedia-segment set is obtained. In an exemplary embodiment of the present invention, one or more customized multimedia-segments such as audio content file, video content file, text content file and graphic content file are individual files stored in a storage device. Further, integrating module 615 integrates one or more customized multimedia-segments corresponding to the customized multimedia-segment to obtain a customized-content part.

Associating module 620 associates the customized-content part with the multimedia content and thereafter display module 625 displays the multimedia content with the customized-content part. The standard-content part such as video content can be displayed in a pure streaming mode, pure downloading mode or a combination of streaming mode and downloading mode. The customized-content part can be displayed before, during or after the standard-content part in the multimedia content. According to an exemplary embodiment of the present invention, the customized-content part can be inserted in pre-roll, mid-roll, and post-roll time slots with reference to the standard-content part.

Further, one or more of the customized multimedia-segments are displayed at a predetermined location to each other on a device used by a viewer. According to one embodiment of the present invention, one or more of the video content, the audio content, the text content and the graphic content are displayed at the predetermined location relative to one another. For example, the text content and the graphic content may be at a predetermined distance and direction relative to each other for displaying a customized-content part with a predetermined location of the text content and the graphic content relative to each other.

The various embodiments of the present invention provide a system and a method for displaying a multimedia content over a network with a customized-content part and a standard-content part. The method and system of the present invention enable dynamic customization of the customized-content part which otherwise is not available for customization. Therefore, the requirement for creating a new customized-content part for fulfilling the requirements of various groups of viewers or for each set of display devices is eliminated.

Further, one or more customized multimedia-segments corresponding to different multimedia components are treated as a separate entity. Modifications can be made to one or more customized multimedia-segments individually. Further, the modified customized multimedia-segments can be dynamically integrated based on the predetermined set of preferences. As a result, it is easier for implementing the desired modifications for a customized-content part.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for displaying a multimedia content over the Internet, the multimedia content comprising a standard-content part and a customized-content part, the customized-content part having at least one multimedia component, the customized-content part being at least one of functionally and structurally independent of the standard-content part, the method comprising:
  selecting on a server coupled to the Internet at least one multimedia component based on a predetermined set of preferences to obtain a multimedia component set, the multimedia component set comprising at least one multimedia component having a plurality of multimedia-segments;
  customizing dynamically on the server at least one multimedia-segment of the at least one of the multimedia components belonging to the multimedia component set based on the predetermined set of preferences and based on information associated with a web browser display device comprising one of a personal computer (PC) and a mobile phone;
  integrating on the server each multimedia component belonging to the multimedia component set including the at least one dynamically customized multimedia-segment to obtain the customized-content part including an advertising content;
  associating the customized-content part with the multimedia content; and
  transmitting the multimedia content having the customized-content part including said advertising content over the Internet from the server to the device for display in said web browser;
  wherein the predetermined set of preferences includes demographic information of a viewer;
  wherein the customized-content part can be modified in real-time based on responses received from said viewer of the customized-content part;
  wherein the customized-content part comprises at least two independent multimedia components;
  wherein a multimedia component further comprises at least one customized multimedia-segment;
  wherein the at least one customized multimedia-segment is selected for customizing dynamically the customized-content part;
  wherein the customized multimedia-segment is one of a video content, an audio content, a text content and a graphic content;
  wherein one or more of the video content, the audio content, the text content and the graphic content are displayed at a predetermined location relative to one another on the device.

2. The method as claimed in claim 1 wherein the demographic information of a viewer includes personal information about the viewer comprising a demographic selected from among the group of demographics consisting of age and gender.

3. The method as claimed in claim 1 wherein the advertising content comprises video content.

4. A method for displaying a multimedia content over a network, the multimedia content comprising a standard-content part and a customized-content part, the customized-content part having at least one multimedia component, a multimedia component comprising at least one customized multimedia-segment, the customized-content part being at least one of structurally and functionally independent of the standard-content part, the method comprising:
  selecting at least one of the multimedia components based on a predetermined set of preferences to obtain a multimedia component set, the multimedia component set comprising at least one multimedia component having at least one customized multimedia-segment;
  selecting the at least one customized multimedia-segment from a corresponding multimedia component belonging to the multimedia component set based on the predetermined set of preferences including demographics to obtain a customized multimedia-segment set;
  integrating the customized multimedia-segments belonging to the customized multimedia-segment set to obtain the customized-content part including an advertising content;
  associating the customized-content part with the multimedia content; and
  displaying the multimedia content with the customized-content part to a viewer with a web browser;
  wherein the customized-content part can be modified in real-time based on responses received from the viewer;
  wherein the customized multimedia-segments are each one of a video content, an audio content, a text content and a graphic content;
  wherein one or more of the video content, the audio content, the text content and the graphic content are displayed at a predetermined location relative to one another with said web browser after being transmitted over the Internet.

5. The method as claimed in claim 4 wherein the demographics include personal information about the viewer comprising a demographic selected from among the group of demographics consisting of age and gender.

6. The method as claimed in claim 4 wherein the advertising content comprises video content.

7. A non-transitory computer readable medium including code segments for displaying a multimedia content over a network comprising:
  code segments selecting at least one multimedia component based on a predetermined set of preferences to obtain a multimedia component set, the multimedia component set comprising at least one multimedia component having at least one customized multimedia-segment;
  code segments customizing dynamically the at least one customized multimedia-segment of at least one multimedia component belonging to the multimedia component set based on the predetermined set of preferences including demographics;
  code segments integrating the multimedia components belonging to the multimedia component set to obtain a customized-content part including an advertising content;
  code segments associating the customized-content part with the multimedia content; and
  code segments transmitting the multimedia content with the customized-content part over a network to a web browser display device.

8. The non-transitory computer readable medium as claimed in claim 7 wherein the demographics include personal information about the viewer comprising a demographic selected from among the group of demographics consisting of age and gender.

9. The non-transitory computer readable medium as claimed in claim 7 wherein the advertising content comprises video content.

10. A computerized system for displaying a multimedia content over a network comprising:
  a server connected to an Internet Protocol (IP) based network, the server including
    a) a first selecting module selecting at least one multimedia component based on a predetermined set of preferences including demographics to obtain a multimedia component set, the multimedia component set comprising at least one multimedia component having at least one customized multimedia-segment;

b) a second selecting module selecting at least one customized multimedia-segment from a corresponding multimedia component belonging to the multimedia component set based on the predetermined set of preferences to obtain a customized multimedia-segment set;

c) an integrating module integrating the customized multimedia-segments belonging to the customized multimedia-segment set to obtain a customized-content part including an advertising content; and d) an associating module associating the customized-content part with the multimedia content; and a device connected to the IP based network including a web browser display module displaying the multimedia content with the customized-content part.

11. The computerized system as claimed in claim 10 wherein the demographics include personal information about the viewer comprising a demographic selected from among the group of demographics consisting of age and gender.

12. The computerized system as claimed in claim 10 wherein the advertising content comprises video content.

* * * * *